US011566662B2

(12) United States Patent
Cox et al.

(10) Patent No.: US 11,566,662 B2
(45) Date of Patent: Jan. 31, 2023

(54) MULTI-AXIS FLEXURE

(71) Applicant: Raytheon Company, Waltham, MA (US)

(72) Inventors: Christopher A. Cox, Torrance, CA (US); Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 412 days.

(21) Appl. No.: 16/664,581

(22) Filed: Oct. 25, 2019

(65) Prior Publication Data

US 2021/0123472 A1   Apr. 29, 2021

(51) Int. Cl.
*F16C 11/12*    (2006.01)
*F16M 11/12*   (2006.01)

(52) U.S. Cl.
CPC ............ *F16C 11/12* (2013.01); *F16M 11/12* (2013.01); *F16C 2300/02* (2013.01)

(58) Field of Classification Search
CPC .... F16C 11/12; F16C 2300/02; F16C 17/024; F16C 17/035; F16C 23/04; F16C 33/02; F16M 11/12; F16M 11/125; F16M 11/126; F16M 11/128; F16M 11/2035; F16D 3/005
USPC ........... 403/291; 384/95, 193, 201, 238, 261
See application file for complete search history.

(56) References Cited

U.S. PATENT DOCUMENTS

| 1,595,744 | A | * | 8/1926 | Trumpler | ................ F16C 17/03 384/286 |
| 2,793,028 | A |   | 5/1957 | Wheeler |  |
| 3,181,918 | A |   | 5/1965 | Troeger |  |
| 3,203,739 | A | * | 8/1965 | Young | ....................... F16D 3/50 403/291 |

(Continued)

FOREIGN PATENT DOCUMENTS

| DE | 102014002182 A1 | 8/2015 |
| EP | 0840023 A1 | 5/1998 |
| GB | 1427170 A | 3/1976 |

OTHER PUBLICATIONS

Meline et al., Universal beam steering mirror design using the cross blade flexure, Aerospace Sensing, 1992, 20 pages, Orlando, Florida.

(Continued)

*Primary Examiner* — Monica E Millner (57) ABSTRACT

A flexure device comprising an interior flexure member having first and second interior flexible blades each formed with an interior end portion and separate interior body portions. An exterior flexure member can have first and second exterior flexible blades each formed with separate exterior end portions and an exterior body portion. The first interior end portion and the first exterior end portion form a first flexure end portion, the second interior portion and the second exterior portion form a second flexure end portion. The interior and exterior body portions are coupled to form a flexure body portion, such that the first interior and exterior flexible blades form a first flexure that facilitates rotation between the first flexure end portion and the flexure body portion. The second interior and exterior flexible blades form a second flexure that facilitates rotation between the second flexure end portion and the flexure body portion.

27 Claims, 8 Drawing Sheets

(56) References Cited

U.S. PATENT DOCUMENTS

| | | | | |
|---|---|---|---|---|
| 3,252,696 | A | * | 5/1966 | Friedel .................. E05D 1/06 |
| | | | | 267/160 |
| 3,360,255 | A | * | 12/1967 | Ormond .................. F16D 3/56 |
| | | | | 267/154 |
| 3,420,582 | A | * | 1/1969 | Shelley .................. F16C 11/12 |
| | | | | 403/291 |
| 3,575,475 | A | * | 4/1971 | Boerner ................. F16D 3/005 |
| | | | | 403/291 |
| 3,700,290 | A | * | 10/1972 | Ensinger ............... G01C 19/22 |
| | | | | 403/291 |
| 3,811,172 | A | * | 5/1974 | Bilinski ................. B21D 28/30 |
| | | | | 29/445 |
| 3,813,089 | A | * | 5/1974 | Troeger ................. F16C 11/12 |
| | | | | 267/160 |
| 3,844,022 | A | | 10/1974 | Kutash |
| 3,856,366 | A | * | 12/1974 | Weisbord .............. G01C 19/22 |
| | | | | 403/291 |
| 4,100,813 | A | * | 7/1978 | Previte .................. G01C 19/22 |
| | | | | 403/291 |
| 4,269,072 | A | * | 5/1981 | Duncan ................. F16C 11/12 |
| | | | | 29/434 |
| 4,286,370 | A | * | 9/1981 | Craig ..................... F16C 11/12 |
| | | | | 29/434 |
| 4,497,465 | A | | 2/1985 | Yeakley et al. |
| 4,592,242 | A | * | 6/1986 | Kempas ................. G01C 19/22 |
| | | | | 403/119 |
| 4,637,596 | A | * | 1/1987 | Lewis .................... F16C 11/12 |
| | | | | 267/160 |
| 4,665,605 | A | * | 5/1987 | Kempas ................. G01C 19/22 |
| | | | | 29/434 |
| 4,692,050 | A | | 9/1987 | Kaufman |
| 4,694,703 | A | * | 9/1987 | Routson ................ G01C 19/22 |
| | | | | 403/291 |
| 4,802,784 | A | * | 2/1989 | Brooks ................... F16C 11/12 |
| | | | | 267/160 |
| 4,812,072 | A | | 3/1989 | Brooks |
| 4,997,123 | A | | 3/1991 | Backus et al. |
| 5,061,107 | A | | 10/1991 | Brooks |
| 5,265,853 | A | * | 11/1993 | Szirtes ................... B64G 1/641 |
| | | | | 16/227 |
| 5,335,418 | A | | 8/1994 | Krivec |
| 5,498,095 | A | | 3/1996 | Krivec |
| 5,620,169 | A | | 4/1997 | Payne |
| 6,146,044 | A | | 11/2000 | Calvet |
| 6,471,435 | B1 | * | 10/2002 | Lee ........................ H01J 37/20 |
| | | | | 403/220 |
| 6,479,782 | B1 | * | 11/2002 | Blackburn .............. B23H 9/00 |
| | | | | 219/69.17 |
| 6,666,612 | B2 | * | 12/2003 | Lorigny ................. F16C 11/12 |
| | | | | 267/160 |
| 6,896,384 | B2 | | 5/2005 | McWhirter et al. |
| 8,702,337 | B2 | * | 4/2014 | Whitney ................ F16C 11/12 |
| | | | | 403/220 |
| 8,708,593 | B2 | | 4/2014 | Stratton |
| 10,443,649 | B2 | | 10/2019 | Balaban et al. |
| 2008/0216286 | A1 | | 9/2008 | Bertele et al. |
| 2011/0188926 | A1 | * | 8/2011 | Stratton ................. F16C 11/12 |
| | | | | 403/119 |
| 2013/0308997 | A1 | | 11/2013 | Smith |
| 2014/0023428 | A1 | | 1/2014 | Kappel et al. |
| 2014/0147193 | A1 | * | 5/2014 | Baudasse ............... F16C 11/12 |
| | | | | 403/220 |
| 2016/0265585 | A1 | * | 9/2016 | Blain ...................... F16C 11/12 |
| 2020/0132248 | A1 | * | 4/2020 | Lazzaro ................. F16M 13/02 |
| 2020/0182290 | A1 | * | 6/2020 | Doehring ............... F16C 17/035 |
| 2020/0200211 | A1 | * | 6/2020 | Gallagher .............. F16C 11/12 |

OTHER PUBLICATIONS

Troeger, Considerations in the Application of Flexural Pivots, Automatic Control Data Systems Engineering, Nov. 1962, 6 pages, vol. 17 No. 4.

International Search Report for International Application No. PCT/US2020/047847 dated Dec. 3, 2020, 16 pages.

* cited by examiner

MULTI-AXIS FLEXURE

BACKGROUND

Mechanisms requiring two-axis pivot capability with large angles and high load transfer typically utilize a universal joint coupler with ball bearings or bushings to allow the pivot motion between moving bodies. In some applications (e.g., a high-precision mechanism like a steering mirror or scan mirror), however, the wear, slop, and limited life typical of bearings or bushings can be very expensive to overcome.

Flexural pivots are often utilized as a substitute for bearings or bushings in precision applications. Flexural pivots are devices that permit mechanical members to pivot about a common axis relative to each other through a limited angle range. Because angular motion is accomplished through flexing of elastic flexural elements, rather than contact surface displacement, flexural pivots operate without friction, and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although flexural pivots can serve as a substitute for bearings or bushings, flexural pivots that provide angular travel about two axes typically include many parts and are difficult and expensive to manufacture. Thus, certain applications can benefit from a flexural pivot that provides two-axis rotation while being relatively simple and cost-effective to produce.

Accordingly, a flexure device is disclosed that provides multi-axis rotational capabilities and can be easily and inexpensively manufactured. The multi-axis flexure device can include an interior flexure member and an exterior flexure member disposed about and coupled to the interior flexure member. The interior flexure member can have a first interior flexible blade connected to and integrally formed with a first interior end portion and an interior body portion. The interior flexure member can have a second interior flexible blade connected to and integrally formed with the interior body portion and a second interior end portion. The exterior flexure member can have a first exterior flexible blade connected to and integrally formed with a first exterior end portion and an exterior body portion. The exterior flexure member can have a second exterior flexible blade connected to and integrally formed with the exterior body portion and a second exterior end portion. The first interior end portion and the first exterior end portion can be coupled to one another to form a first flexure end portion, the second interior portion and the second exterior portion can be coupled to one another to form a second flexure end portion, and the interior body portion and the exterior body portion can be coupled to one another to form a flexure body portion, such that the first interior flexible blade and the first exterior flexible blade form a first cross-blade flexure operable to facilitate relative rotation between the first flexure end portion and the flexure body portion about a first axis, and the second interior flexible blade and the second exterior flexible blade form a second cross-blade flexure operable to facilitate relative rotation between the second flexure end portion and the flexure body portion about a second axis.

A multi-axis flexure system is also disclosed. The multi-axis flexure system can include a multi-axis flexure device. The multi-axis flexure device can include an interior flexure member and an exterior flexure member disposed about and coupled to the interior flexure member. The interior flexure member can have a first interior flexible blade connected to and integrally formed with a first interior end portion and an interior body portion. The interior flexure member can have a second interior flexible blade connected to and integrally formed with the interior body portion and a second interior end portion. The exterior flexure member can have a first exterior flexible blade connected to and integrally formed with a first exterior end portion and an exterior body portion. The exterior flexure member can have a second exterior flexible blade connected to and integrally formed with the exterior body portion and a second exterior end portion. The first interior end portion and the first exterior end portion can be coupled to one another to form a first flexure end portion, the second interior portion and the second exterior portion can be coupled to one another to form a second flexure end portion, and the interior body portion and the exterior body portion can be coupled to one another to form a flexure body portion, such that the first interior flexible blade and the first exterior flexible blade form a first cross-blade flexure operable to facilitate relative rotation between the first flexure end portion and the flexure body portion about a first axis, and the second interior flexible blade and the second exterior flexible blade form a second cross-blade flexure operable to facilitate relative rotation between the second flexure end portion and the flexure body portion about a second axis. The multi-axis flexure system can also include a first structure coupled to the first flexure end portion and a second structure coupled to the second flexure end portion to facilitate relative rotation of the first and second structures about the first and second axes.

To further describe the present technology, examples are now provided with reference to the figures. With reference to FIGS. 1A-5B, one example of a multi-axis flexure device 100 is illustrated. As best illustrated in FIGS. 1-2B and 4-5B, the multi-axis flexure device 100 can comprise an interior flexure member 110 and an exterior flexure member 120 disposed about and coupled to the interior flexure member 110.

The interior flexure member 110 can include first and second interior flexible blades 111*a*, 111*b*. The first interior flexible blade 111*a* can be connected to and integrally formed with a first interior end portion 112 and an interior body portion 113. The second interior flexible blade 111*b* can be connected to and integrally formed with the interior body portion 113 and a second interior end portion 114. In addition, the exterior flexure member 120 can include first and second exterior flexible blades 121*a*, 121*b*. The first exterior flexible blade 121*a* can be connected to and integrally formed with a first exterior end portion 122*a* and an exterior body portion 123. The second exterior flexible blade 121*b* can be connected to and integrally formed with the exterior body portion 123 and a second exterior end portion 124*a*.

Figure 1A:
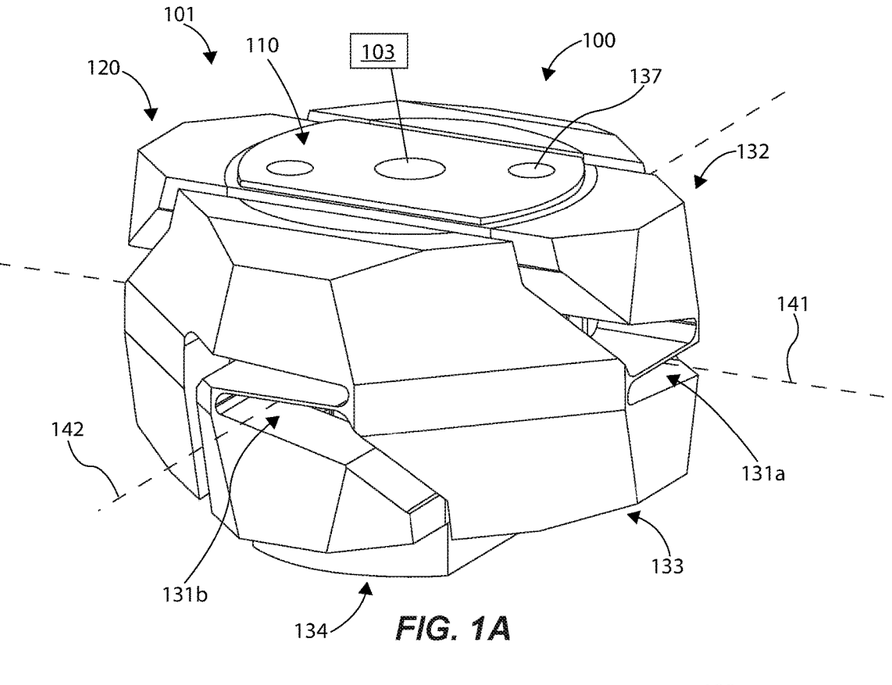
FIG. 1A is a top perspective view of a multi-axis flexure device in accordance with an example of the present disclosure.
Figure 1B:
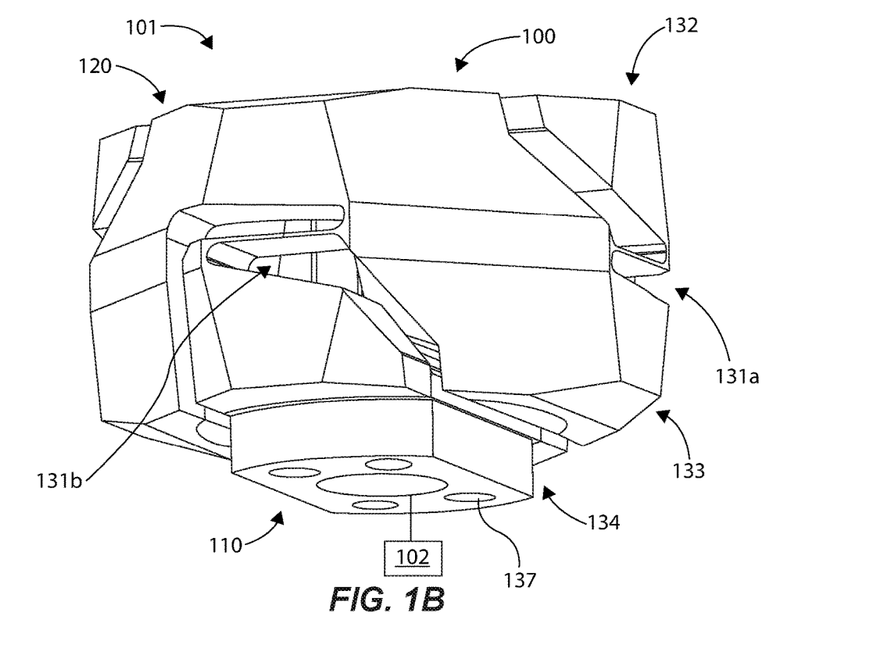
FIG. 1B is a bottom perspective view of the multi-axis flexure device of FIG. 1A.

As shown in FIGS. 1A-1B, the first interior end portion 112 and the first exterior end portion 122*a* can be coupled to one another to form a first flexure end portion 132. The interior body portion 113 and the exterior body portion 123 can be coupled to one another to form a flexure body portion 133. The second interior end portion 114 and the second exterior end portion 124*a* can be coupled to one another to form a second flexure end portion 134. Thus configured, the first interior and exterior flexible blades 111*a*, 121*a* can form a first cross-blade flexure 131*a* (see FIG. 3B) operable to facilitate relative rotation between the first flexure end portion 132 and the flexure body portion 133 about a first axis 141 (see FIG. 1A). Additionally, the second interior and exterior flexible blades 111*b*, 121*b* can form a second cross-blade flexure 131*b* (see FIG. 3A) operable to facilitate relative rotation between the second flexure end portion 134 and the flexure body portion 133 about a second axis 142 (see FIG. 1A). The first and second cross-blade flexures 131*a*, 131*b* can be configured, such that the first and second axes 141, 142 are in any suitable orientation or position relative to one another. In one aspect, the first and second axes 141, 142 can intersect. In another aspect, the first and second axes 141, 142 can be orthogonal.

Referring again primarily to FIGS. 1-2B and 4-5B, in one aspect, the multi-axis flexure device 100 can include multiple cross-blade flexures configured to facilitate rotation about a given axis, which can provide enhanced stiffness and stability. For example, the interior flexure member 110 can include third and fourth interior flexible blades 111*c*, 111*d* (the third interior flexible blade 111*c* being obscured from view in several figures, but seen in cross-section in FIG. 5A.) The third interior flexible blade 111*c* can be connected to and integrally formed with the first interior end portion 112 and the interior body portion 113. The fourth interior flexible blade 111*d* can be connected to and integrally formed with the interior body portion 113 and the second interior end portion 114. Thus, the first and third interior flexible blades 111*a*, 111*c* can each be connected to the first interior end portion 112 and the interior body portion 113, and the second and fourth interior flexible blades 111*b*, 111*d* can each be connected to the interior body portion 113 and the second interior end portion 114.

In one aspect, the first and third interior flexible blades 111*a*, 111*c* can be combined into a single interior flexible blade that extends through the center of the interior flexure member 110, with the second and fourth interior flexible blades 111*b*, 111*d* remaining as shown and described. In this case, a single, wide interior flexible blade can be utilized with two relatively narrow interior flexible blades to facilitate rotation about the first and second axes 141, 142.

In addition, the exterior flexure member 120 can include third and fourth exterior flexible blades 121*c*, 121*d*. The third exterior flexible blade 121*c* can be connected to and integrally formed with a third exterior end portion 122*b* and the exterior body portion 123. The fourth exterior flexible blade 121*d* can be connected to and integrally formed with the exterior body portion 123 and a fourth exterior end portion 124*b*. Thus, the first and third exterior flexible blades 121*a*, 121*c* can each be connected to the exterior body portion 123 while being connected to the different first and third exterior end portions 122*a*, 122*b*, respectively. Similarly, the second and fourth exterior flexible blades 121*b*, 121*d* can each be connected to the exterior body portion 123 while being connected to the different second and fourth exterior end portions 124*a*, 124*b*, respectively.

The first interior end portion 112 can be coupled to both the first and third exterior end portions 122*a*, 122*b* to form the first flexure end portion 132. The second interior end portion 114 can be coupled to both the second and fourth exterior end portions 124*a*, 124*b* to form the second flexure end portion 134. Thus configured, the third interior and exterior flexible blades 111*c*, 121*c* can form a third cross-blade flexure 131*c* (see FIG. 3B), which along with the first cross-blade flexure 131*a*, can be operable to facilitate relative rotation between the first flexure end portion 132 and the flexure body portion 133 about the first axis 141. Additionally, the fourth interior and exterior flexible blades 111*d*, 121*d* can form a fourth cross-blade flexure 131*d* (see FIG. 3A), which along with the second cross-blade flexure 131*b*, can be operable to facilitate relative rotation between the second flexure end portion 134 and the flexure body portion 133 about the second axis 142.

Figure 5A:
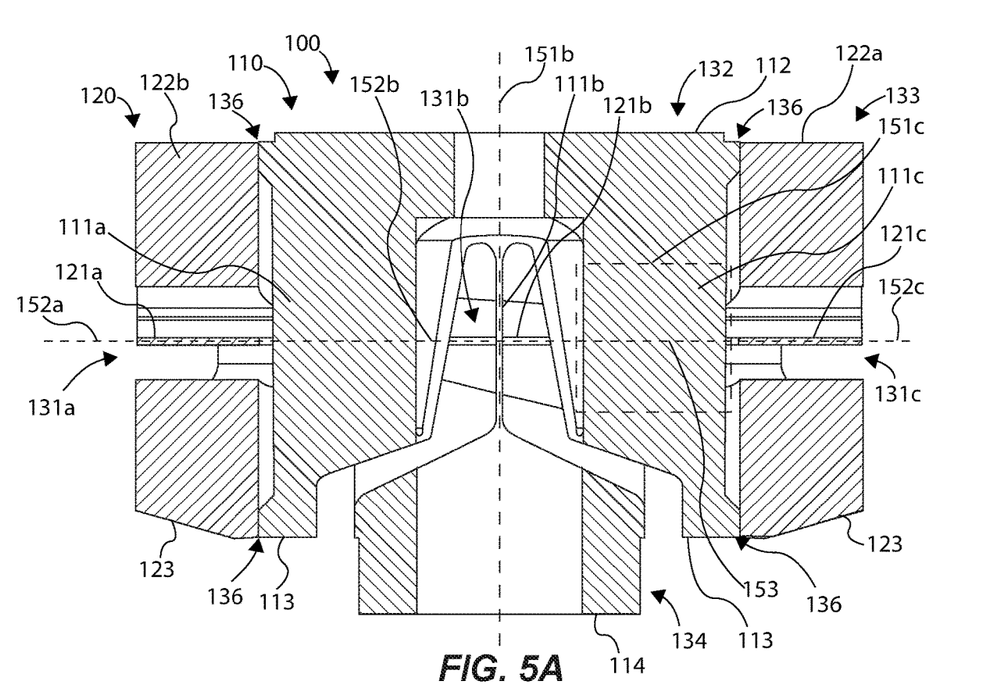
FIGS. 5A and 5B are side cross-sectional views of the multi-axis flexure device of FIG. 1A.
Figure 5B:
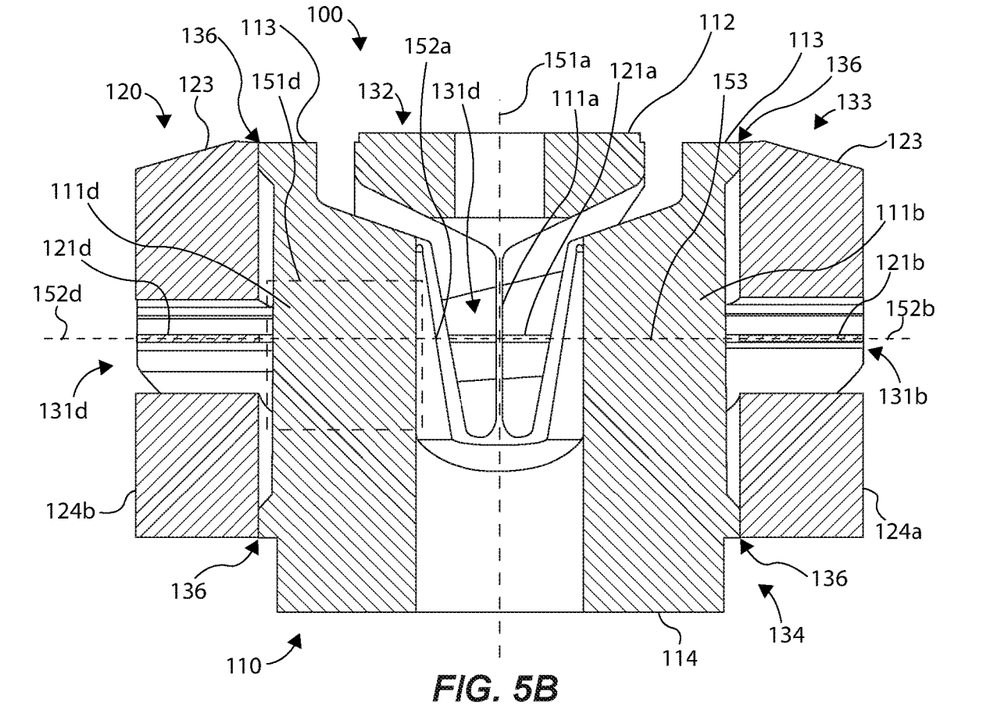

In general, the interior and exterior flexible blades can be arranged, such that pairs of the interior and exterior flexible blades can form cross-blade flexures (e.g., cross-blade flexures 131a-d). Typically, pairs of the interior and exterior flexible blades will be oriented or arranged substantially 90 degrees (i.e., perpendicular or orthogonal) relative to one another to achieve a cross blade configuration, although other configurations (e.g., non-perpendicular) are possible. For example, as illustrated in FIGS. 5A-5B, the first interior flexible blade 111a and the first exterior flexible blade 121a can define respective planes 151a, 152a that are orthogonal to one another. In addition, the second interior flexible blade 111b and the second exterior flexible blade 121b can define respective planes 151b, 152b that are orthogonal to one another.

Figure 6A:
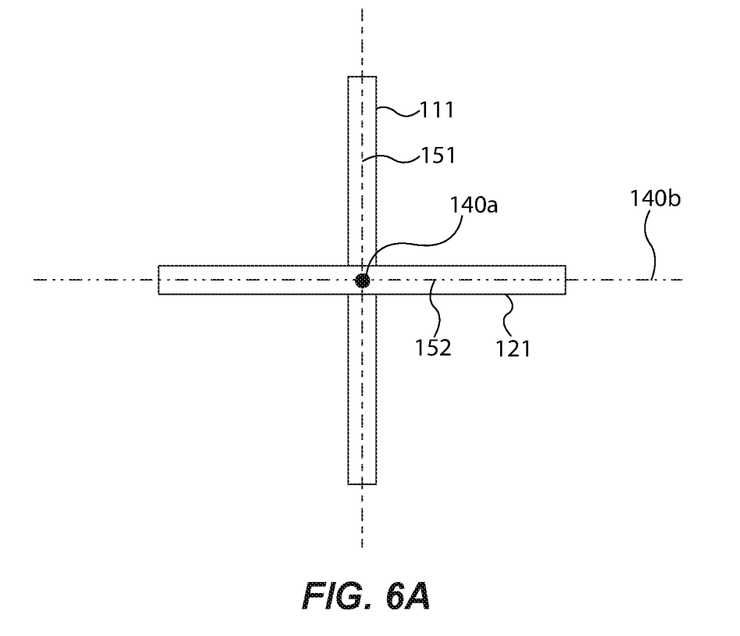
FIG. 6A illustrates a representative cross-blade flexure in accordance with an example of the present disclosure.
Figure 6B:
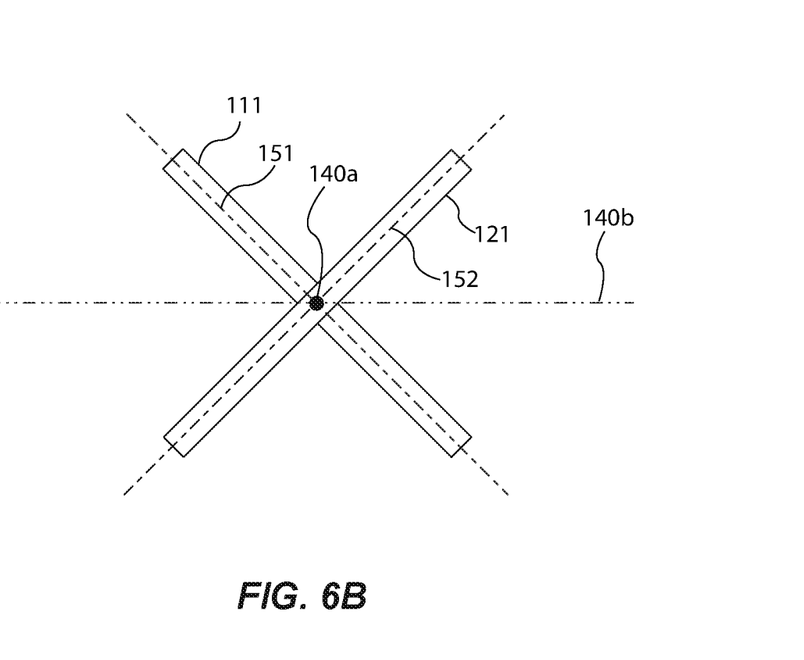
FIG. 6B illustrates a representative cross-blade flexure in accordance with another example of the present disclosure.

In addition, the orientation of the cross-blade flexures 131a-d can have any suitable orientation or relationship relative to the rotational axes 141, 142. FIGS. 6A-6B illustrate a representative cross-blade flexure 131 that includes a pair of interior and exterior flexible blades 111, 121 shown isolated from other structures for clarity. The cross-blade flexure 131 is configured to facilitate rotation about a representative rotational axis 140a. The figures also show an axis 140b, which is a representative rotational axis of another cross-blade flexure that is not shown. The interior flexible blade 111 defines a plane 151 and the exterior flexible blade 121 defines a plane 152. In FIG. 6A, the plane 151 defined by the interior flexible blade 111 is perpendicular to a plane defined by the intersecting axes 140a, 140b. In addition, the plane 152 defined by the exterior flexible blade 121 is parallel to the plane defined by the intersecting axes 140a, 140b. This representative example can be seen in specific examples of the multi-axis flexure device 100 as illustrated in FIGS. 5A-5B. For example, at least one of the first or second interior flexible blades 111a, 111b can define respective planes 151a, 151b that are perpendicular to a plane 153 defined by the first and second axes 141, 142. In another example, at least one of the first or second exterior flexible blades 121a, 121b can define respective planes 152a, 152b that are parallel to the plane 153 defined by the first and second axes 141, 142.

In one aspect, as illustrated in FIG. 6B, the plane 151 defined by the interior flexible blade 111 can be non-perpendicular to the plane defined by the intersecting axes 140a, 140b. In addition, the plane 152, defined by the exterior flexible blade 121, can be non-parallel to the plane defined by the intersecting axes 140a, 140b. Although this representative example is not shown with respect to the multi-axis flexure device 100, it should be recognized that at least one of the first or second interior flexible blades 111a, 111b can define respective planes 151a, 151b that are non-perpendicular to the plane 153 defined by the first and second axes 141, 142. Additionally, at least one of the first or second exterior flexible blades 121a, 121b can define respective planes 152a, 152b that are non-parallel to the plane 153 defined by the first and second axes 141, 142.

In one aspect, the various interior flexible blades 111a-d can have any suitable relationship with one another. For example, the first and second interior flexible blades 111a, 111b can define respective planes 151a, 151b that are orthogonal to one another. The third interior flexible blade 111c can define a plane 151c that is parallel to the plane 151a defined by the first interior flexible blade 111a, In addition, the fourth interior flexible blade 111d can define a plane 151d that is parallel to the plane 151b defined by the second interior flexible blade 111b.

In another aspect, the various exterior flexible blades 12 a-d can have any suitable relationship with one another. For example, the first and second exterior flexible blades 121a, 121b can define respective planes 152a, 152b that are parallel to one another. The third exterior flexible blade 121c can define a plane 152c that is parallel to the plane 152a defined by the first exterior flexible blade 121a, Additionally, the fourth exterior flexible blade 121d can define a plane 152d that is parallel to the plane 152b defined by the second exterior flexible blade 121b.

In one aspect, the interior and exterior flexible blades 111a-d, 121a-d can be configured to avoid contacting adjacent structures (e.g., another flexible blade and/or a support structure to which the flexible blade is coupled) to facilitate smooth, unrestricted movement of the interior and exterior flexible blades 111a-d, 121a-d during operation. The interior and exterior flexible blades disclosed herein can have any suitable dimension, as the principles disclosed herein provide flexible blades and supporting structures that are scalable to accommodate a wide range of sizes and applications.

Figure 2A:
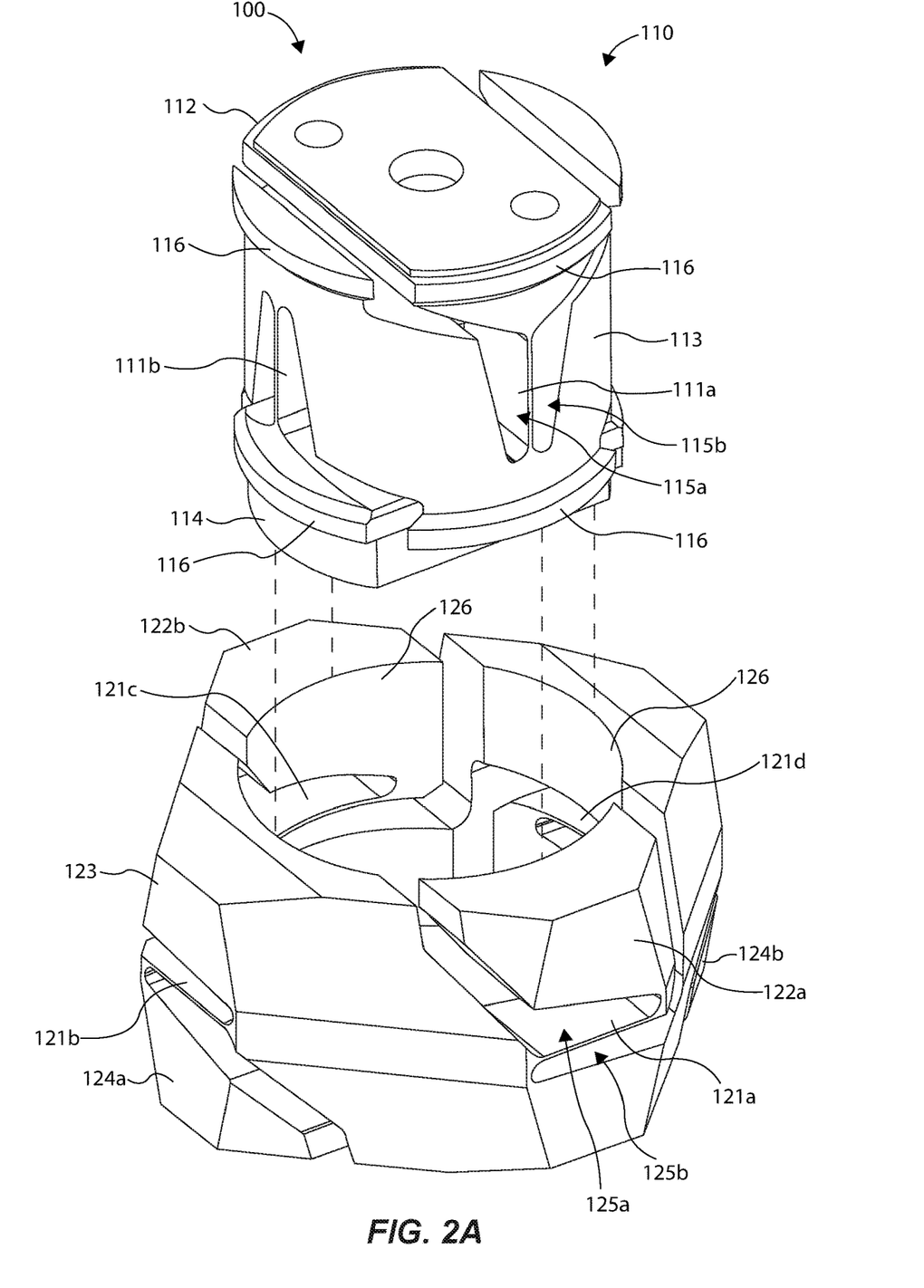
FIGS. 2A and 2B are exploded views of the multi-axis flexure device of FIG. 1A.
Figure 2B:
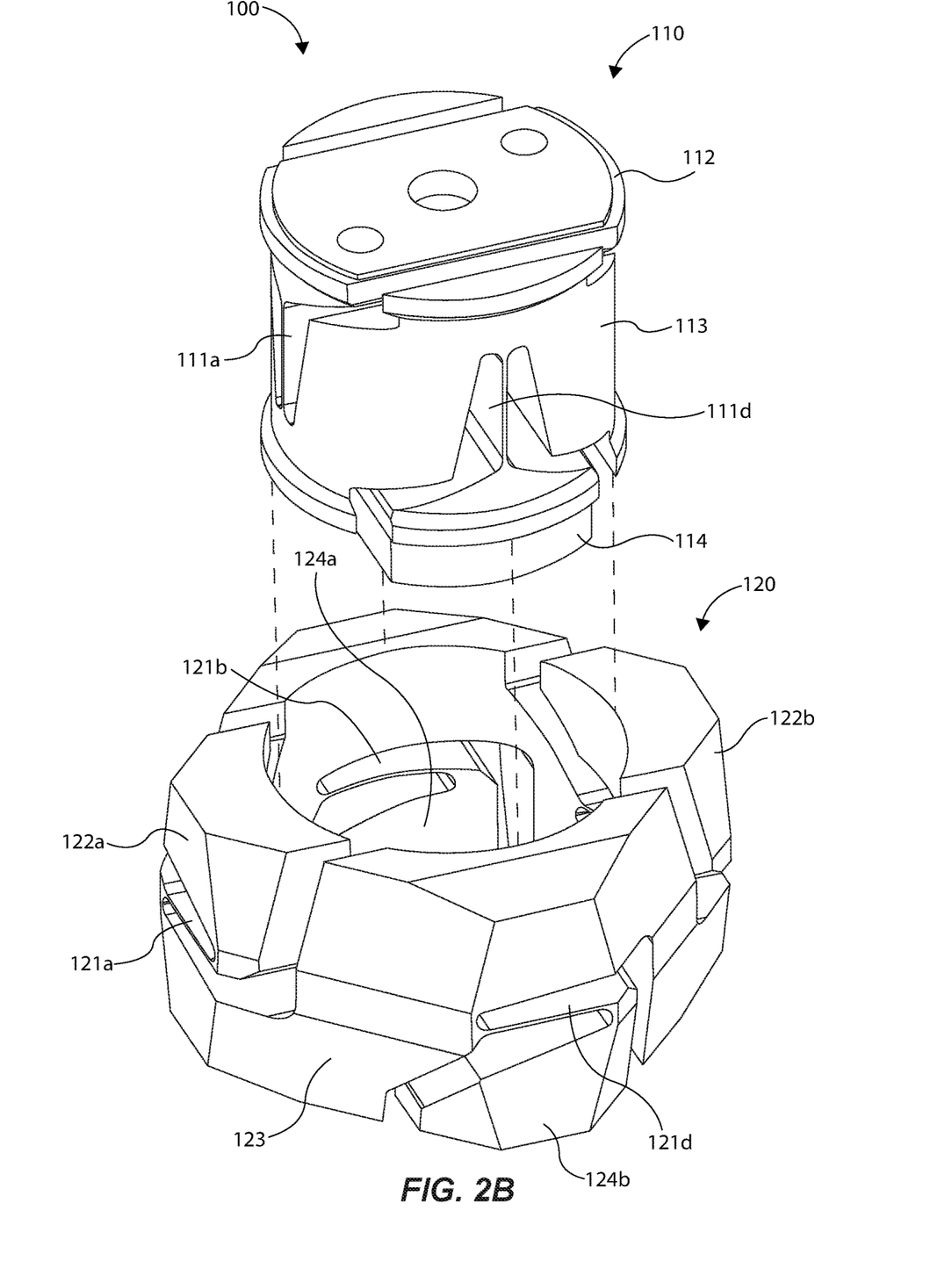
Figure 3A:
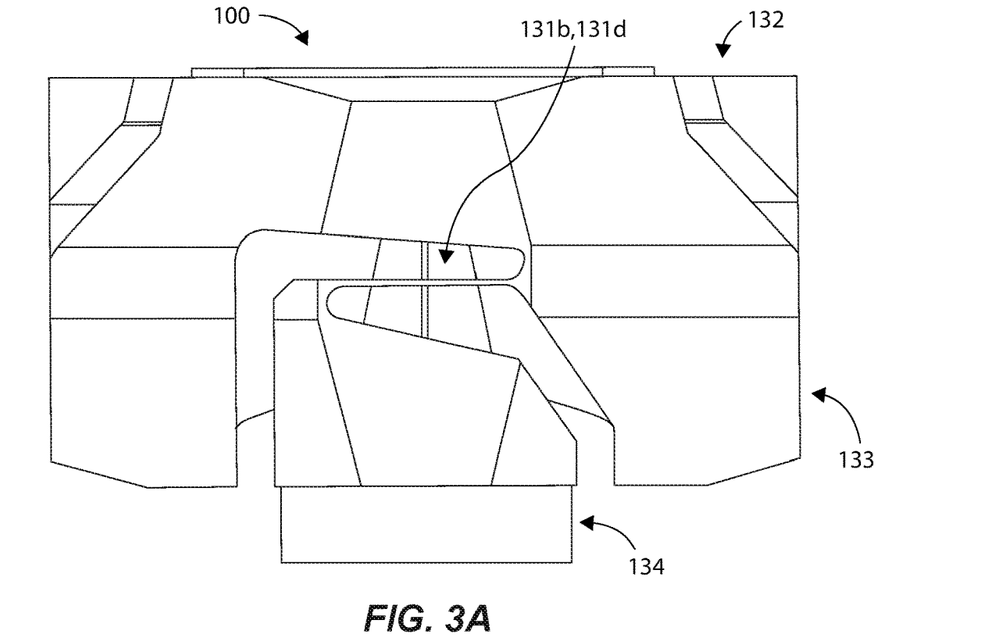
FIGS. 3A and 3B are side views of the multi-axis flexure device of FIG. 1A.
Figure 3B:
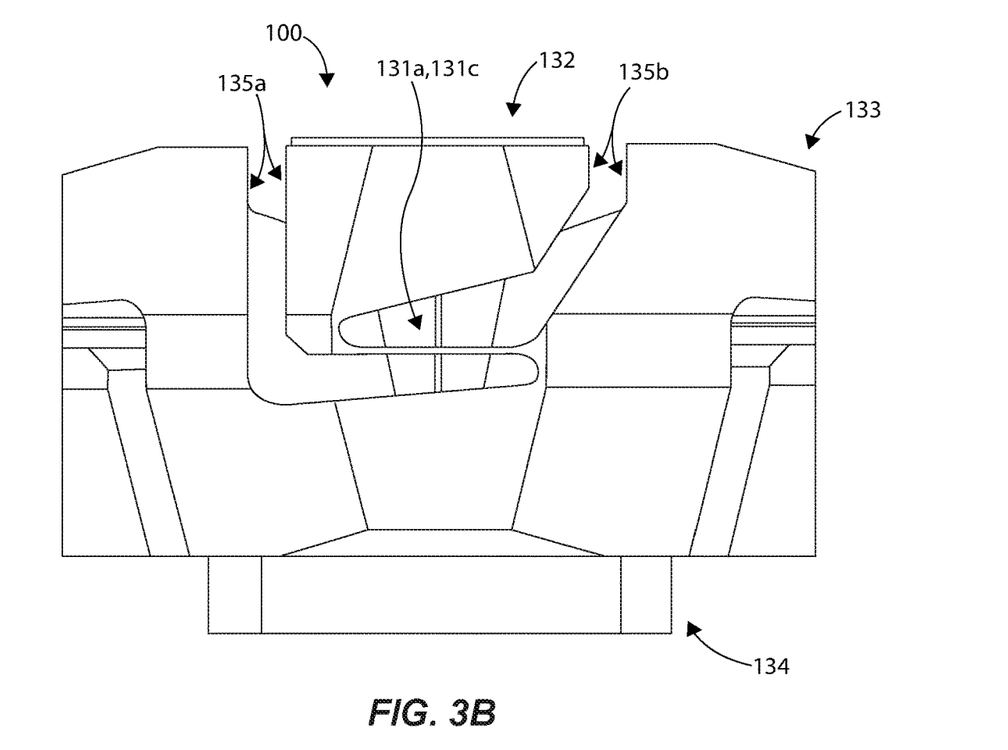
Figure 4:
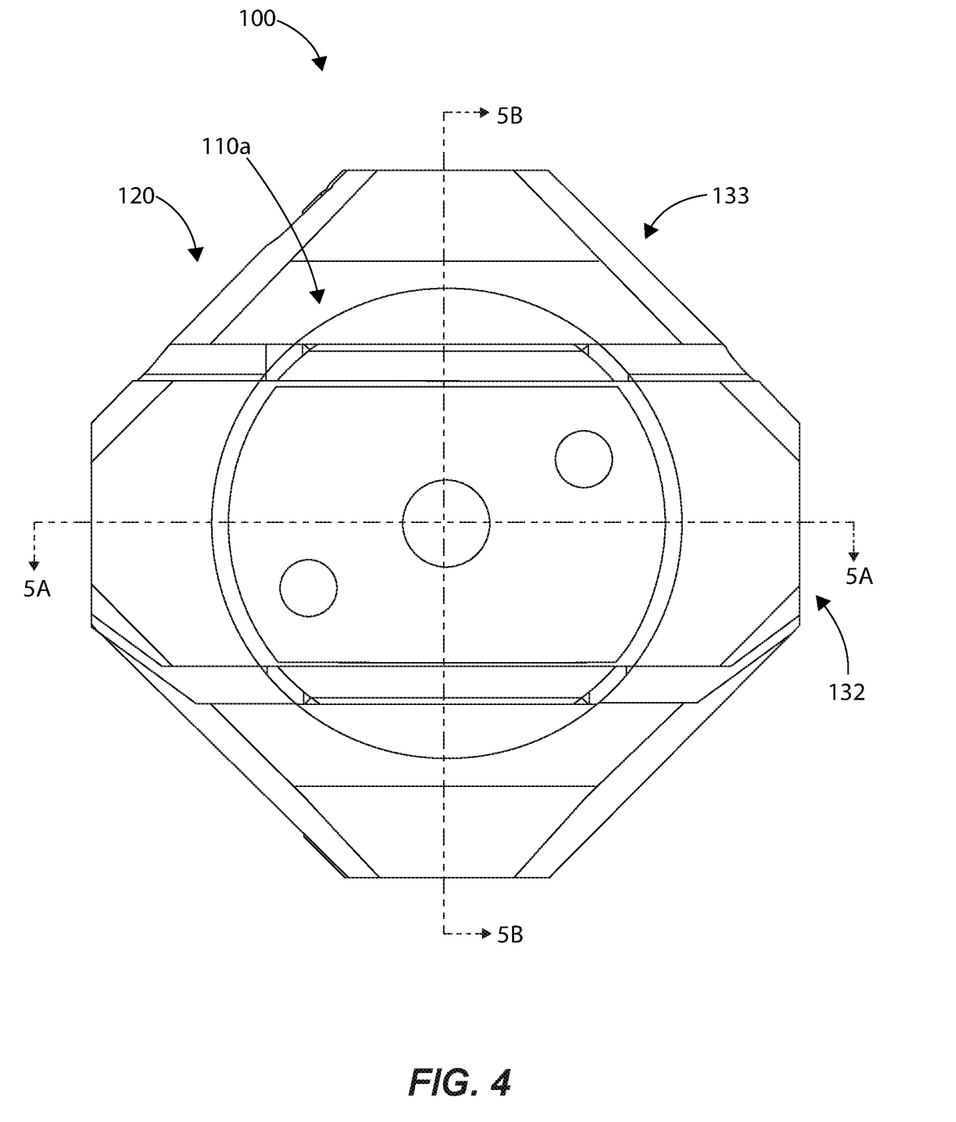
FIG. 4 is a top view of the multi-axis flexure device of FIG. 1A.

In one aspect, slots formed in the interior flexure member 110 and/or the exterior flexure member 120 can at least partially define the respective interior and exterior flexible blades 111a-d, 121a-d. For example, as shown in FIG. 2A, slots 115a, 115b can at least partially define the interior flexible blade 111a, and slots 125a, 125b can at least partially define the exterior flexible blade 121a. In another aspect, slots formed in the interior flexure member 110 and/or the exterior flexure member 120 can at least partially define travel stops to mechanically limit a rotatable range of motion of the interior and exterior flexible blades 111a-d, 121a-d. For example, as shown in FIG. 3B, the slots 115a, 115b and/or the slots 125a, 125b (identified in FIG. 2A) can at least partially define travel stops 135a, 135b, which can serve as mechanical stops or limits to angular travel of the cross-blade flexure 131a. The travel stops 135a, 135b can limit the range of motion to any suitable degree. Typically, the travel stops 135a, 135b will be configured to prevent excessive bending of the interior and exterior flexible blades 111a, 121a that may result in failure (e.g., yielding) of the blades. The slots 115a, 115b and the slots 125a, 125b can have any geometry or configuration to provide suitable travel stop shapes and interface surfaces.

As shown in FIGS. 1A-1B, the multi-axis flexure device 100 can be coupled to external structures 102, 103 to facilitate relative rotation of the structures about the axes 141, 142. For example, the multi-axis flexure device 100 can be coupled to and utilized with fast steering mirrors, which are commonly used in directed energy systems, long range laser communications systems, telescopes, or other precision optics applications, and therefore may be included in laboratory-based systems, airborne line of sight stabilization systems, satellites, etc. Thus, one external structure 102 can be a base or support structure for a movable body, such as a mounting structure of a satellite, and the other external structure 103 can be a movable body, such as a mirror. The multi-axis flexure device 100 can be coupled to external structures 102, 103 in any suitable manner. For example, the external structures 102, 103 can be coupled to the first and second flexure end portions 132, 134 utilizing coupling interfaces such as openings or holes 137 (which may be threaded), a slot, a pin (e.g., disposed in a hole 137), a stud, and other coupling interfaces. The first and second flexure end portions 132, 134 can have any suitable configuration to facilitate coupling with the structures 102, 103, which may be influenced by a desired packaging configuration of the structures 102, 103. In addition, the general outer shape or profile of the multi-axis flexure device 100 may be governed by the shape or design of the interior and exterior flexible blades 111*a-d*, 121*a-d*, space constraints, etc. In one aspect, a multi-axis flexure system 101 can include the multi-axis flexure device 100 and first and second structures 102, 103 coupled to the multi-axis flexure device 100.

In one aspect, the interior flexure member 110 can be a single, monolithic structure (e.g., a one-piece structure created from a single workpiece or item of material). Specifically, the first interior end portion 112, the interior body portion 113, the second interior end portion 114, and the interior flexible blades 111*a-d* (as applicable) can form a single, monolithic structure. Similarly, the exterior flexure member 120 can be a single, monolithic structure. Specifically, the first exterior end portion 122*a*, the second exterior end portion 124*a*, the third exterior end portion 122*b*, the fourth exterior end portion 124*b*, the exterior body portion 123, and the exterior flexible blades 121*a-d*, as included in a given example, can form a single, monolithic structure.

The interior and exterior flexure members 110, 120 can have any suitable profile for mating or interfacing with one another. In the illustrated examples, the interior flexure member 110 has a cylindrical outer profile and the exterior flexure member 120 has a cylindrical opening or hole to receive the interior flexure member 110. It should be recognized that the interior flexure member 110 can have any suitable outer profile or shape and the exterior flexure member 120 can have any suitable configuration to receive and interface with the interior flexure member 110.

In one aspect, the interior and exterior flexure members 110, 120 can have respective interface surfaces 116, 126 (FIG. 2A) that are configured to interface and facilitate coupling the interior and exterior flexure members 110, 120 to one another at interface locations 136 (FIGS. 5A-5B). The interior and exterior flexure members 110, 120 can be coupled to one another in any suitable manner. For example, the interior and exterior flexure members 110, 120 can be coupled to one another by at least one of a weld using a weld material, a braze using a braze material, a solder using a solder material, or an adhesive using an adhesive material.

Figure 7:
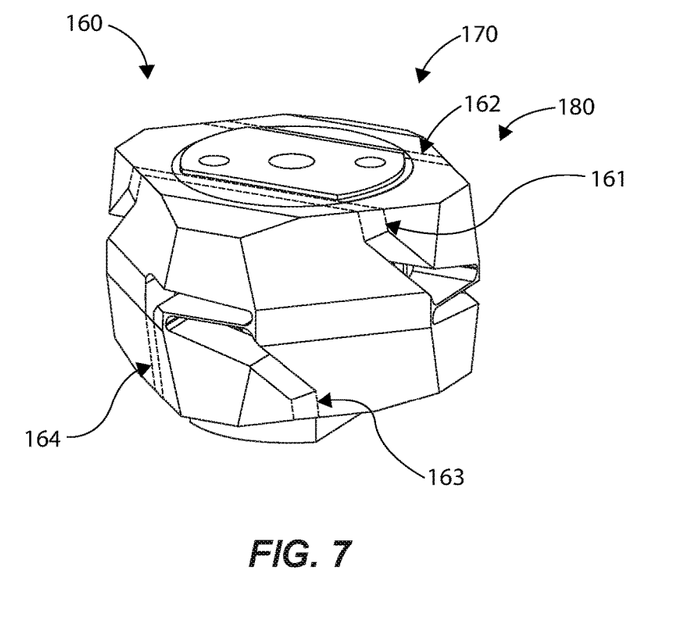
FIG. 7 is a top perspective view of a multi-axis flexure device precursor in accordance with an example of the present disclosure.

Referring to FIG. 7, a multi-axis flexure device precursor 160 is illustrated, in accordance with an example of the present disclosure. The multi-axis flexure device precursor 160 can include an interior flexure member precursor 170 and an exterior flexure member precursor 180 disposed about and coupled to the interior flexure member precursor 170. The interior flexure member precursor 170 and the exterior flexure member precursor 180 are shown individually in FIGS. 8A and 8B, respectively.

Figure 8A:
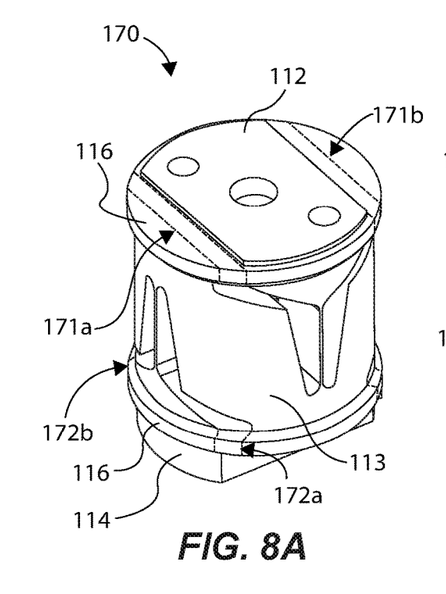
FIG. 8A is a perspective view of an interior flexure member precursor of the multi-axis flexure device precursor of FIG. 7, in accordance with an example of the present disclosure.

The interior flexure member precursor 170 is similar to the interior flexure member 110 discussed above. Where identical, the same reference numbers identify the same elements or features in both the interior flexure member 110 and the interior flexure member precursor 170. The primary difference is that the interior flexure member precursor 170 includes one or more sacrificial portions that aid in fabrication of the multi-axis flexure device 100, which are then removed to arrive at the final product. In particular, the interior flexure member precursor 170 can have one or more first interior sacrificial connecting portions 171*a*, 171*b* connected to and integrally formed with the first interior end portion 112 and the interior body portion 113. The interior flexure member precursor 170 can also have one or more second interior sacrificial connecting portions 172*a*, 172*b* connected to and integrally formed with the interior body portion 113 and the second interior end portion 114.

Figure 8B:
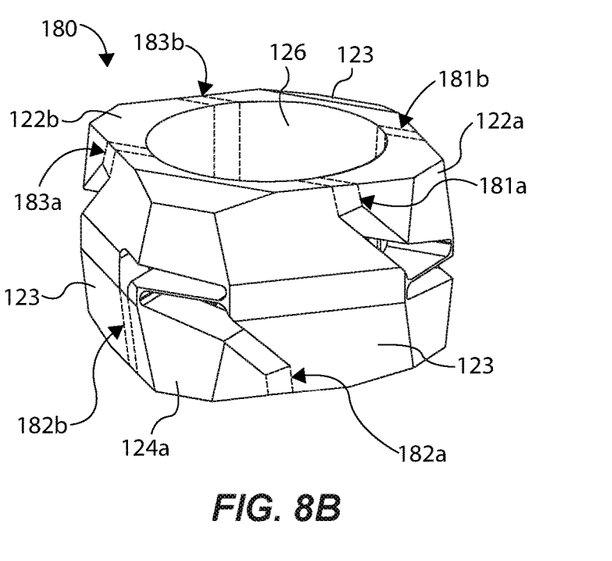
FIG. 8B is a perspective view of an exterior flexure member precursor of the multi-axis flexure device precursor of FIG. 7, in accordance with an example of the present disclosure, Reference will now be made to the exemplary embodiments illustrated, and specific language will be used herein to describe the same. It will nevertheless be understood that no limitation of the scope of the invention is thereby intended.

The exterior flexure member precursor 180 is similar to the exterior flexure member 120 discussed above. Where identical, the same reference numbers identify the same elements or features in both the exterior flexure member 120 and the exterior flexure member precursor 180. The primary difference is that the exterior flexure member precursor 180 includes one or more sacrificial portions that aid in fabrication of the multi-axis flexure device 100, which are then removed to arrive at the final product. In particular, the exterior flexure member precursor 180 can have one or more first exterior sacrificial connecting portions 181*a*, 181*b* connected to and integrally formed with the first exterior end portion 122*a* and the exterior body portion 123. The exterior flexure member precursor 180 can also have one or more second exterior sacrificial connecting portions 182*a*, 182*b* connected to and integrally formed with the exterior body portion 123 and the second exterior end portion 124*a*. One or more third exterior sacrificial connecting portion 183*a*, 183*b* may also be connected to and integrally formed with the third exterior end portion 122*b* and the exterior body portion 123. Additionally, one or more fourth exterior sacrificial connecting portions (obscured from view) may also be connected to and integrally formed with the fourth exterior end portion 124*b* and the exterior body portion 123.

The interior flexure member precursor 170 (or the interior flexure member 110) and the exterior flexure member precursor 180 (or the exterior flexure member 120) can be manufactured in any suitable manner utilizing any suitable process or combination of processes. For example, the interior flexure member precursor 170 (or the interior flexure member 110) and/or the exterior flexure member precursor 180 (or the exterior flexure member 120) may be formed by machining, extruding, casting, forging, and others as will be recognized by those skilled in the art. Example machining processes include electrical discharge machining (EDM), water jet cutting, milling, drilling, broaching, etc. A manufacturing process may be selected based on the design objectives, tolerance requirements, cost, etc. A wire EDM process may provide precise machining that can meet tight tolerances and accurately control the flexure surfaces, which may be highly stressed during operation. Final surfaces may be achieved by grinding, honing, polishing, etc. to a desired geometric and/or dimensional tolerance, and/or surface finish. The interior flexure member precursor 170 (or the interior flexure member 110) and/or the exterior flexure member precursor 180 (or the exterior flexure member 120) can be made of any suitable material, such as titanium or steel.

In one aspect, the principles disclosed herein can provide a flexure design that is relatively simple to manufacture. For example, instead of manufacturing individual flexure cross blades, multiple flexible members and their supports can be manufactured simultaneously in each of the interior flexure member precursor 170 (or the interior flexure member 110) and the exterior flexure member precursor 180 (or the exterior flexure member 120). Each of these components can be relatively easily constructed and then assembled and permanently joined. For example, the interior flexure member precursor 170 and the exterior flexure member precursor 180 can be assembled as shown in FIG. 7. The interface surfaces 116, 126 can be coupled or joined as described above, such as by at least one of a weld, a braze, a solder, or an adhesive.

The use of sacrificial connecting portions (e.g., the interior sacrificial connecting portions 171*a-b*, 172*a-b* and the exterior sacrificial connecting portions 181a-b, 182a-b, 183a-b) can constrain the interior flexible blades 111a-d and the exterior flexible blades 121a-d to prevent movement during manufacture and assembly. Once the interior flexure member precursor 170 and the exterior flexure member precursor 180 have been joined, the sacrificial connecting portions can be removed to "free" or release the cross-blade flexures 131a-d and enable full functionality of the multi-axis flexure device 100. The sacrificial connecting portions (e.g., the interior sacrificial connecting portions 171a-b, 172a-b and the exterior sacrificial connecting portions 181a-b, 182a-b, 183a-b) can be removed from the multi-axis flexure device precursor 160 by making "relief cuts" to remove the sacrificial material at locations 161-164. The sacrificial connecting portions can be removed by any suitable process or technique, such as cutting, sawing, and others. A wire EDM process may be utilized to provide accurate control of the surfaces resulting from material removal process.

In an alternative example, a multi-axis flexure device as disclosed herein can be made by injection molding, casting, or 3-D printing the entire device as a single, monolithic part.

In accordance with one example of the present invention, a method for making a multi-axis flexure device is disclosed. The method can comprise obtaining an interior flexure member precursor having a first interior flexible blade connected to and integrally formed with a first interior end portion and an interior body portion, and a second interior flexible blade connected to and integrally formed with the interior body portion and a second interior end portion, a first interior sacrificial connecting portion connected to and integrally formed with the first interior end portion and the interior body portion, and a second interior sacrificial connecting portion connected to and integrally formed with the second interior end portion and the interior body portion. The method can also comprise obtaining an exterior flexure member precursor having a first exterior flexible blade connected to and integrally formed with a first exterior end portion and an exterior body portion, and a second exterior flexible blade connected to and integrally formed with the exterior body portion and a second exterior end portion, a first exterior sacrificial connecting portion connected to and integrally formed with the first exterior end portion and the exterior body portion, and a second exterior sacrificial connecting portion connected to and integrally formed with the second exterior end portion and the exterior body portion. The method can further comprise disposing the exterior flexure member about the interior flexure member. The method can still further comprise coupling the exterior flexure member to the interior flexure member, wherein the first interior end portion and the first exterior end portion are coupled to one another to form a first flexure end portion, the second interior end portion and the second exterior end portion are coupled to one another to form a second flexure end portion, and the interior body portion and the exterior body portion are coupled to one another to form a flexure body portion, such that the first interior flexible blade and the first exterior flexible blade form a first cross-blade flexure, and the second interior flexible blade and the second exterior flexible blade form a second cross-blade flexure. Furthermore, the method can comprise removing the first interior sacrificial connecting portion and the first exterior sacrificial connecting portion to separate the first interior end portion and the first exterior end portion from the interior body portion and the exterior body portion, wherein the first cross-blade flexure is operable to facilitate relative rotation between the first flexure end portion and the flexure body portion about a first axis. Additionally, the method can comprise removing the second interior sacrificial connecting portion and the second exterior sacrificial connecting portion to separate the second interior end portion and the second exterior end portion from the interior body portion and the exterior body portion, wherein the second cross-blade flexure is operable to facilitate relative rotation between the second flexure end portion and the flexure body portion about a second axis. It is noted that no specific order is required in this method, though generally in one embodiment, these method steps can be carried out sequentially.

In one aspect of the method, obtaining the interior flexure member precursor can comprise forming the first and second interior flexible blades in a workpiece. In one aspect, forming the first and second interior flexible blades in the workpiece can comprise machining the workpiece. In one aspect, machining the workpiece can comprise at least one of electrical discharge machining (EDM) or milling.

In one aspect of the method, obtaining the exterior flexure member precursor can comprise forming the first and second exterior flexible blades in a workpiece. In one aspect, forming the first and second exterior flexible blades in the workpiece can comprise machining the workpiece. In one aspect, machining the workpiece can comprise at least one of electrical discharge machining (EDM) or milling.

In one aspect of the method, coupling the exterior flexure member to the interior flexure member can comprise at least one of welding, brazing, soldering, or bonding.

In one aspect of the method, removing the first interior sacrificial connecting portion and the first exterior sacrificial connecting portion can comprise at least one of electrical discharge machining (EDM), milling, or cutting.

In one aspect of the method, removing the second interior sacrificial connecting portion and the second exterior sacrificial connecting portion can comprise at least one of electrical discharge machining (EDM), milling, or cutting.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A multi-axis flexure device, comprising:
an interior flexure member having
a first interior flexible blade connected to and integrally formed with a first interior end portion and an interior body portion, at least a portion of the first interior flexible blade comprising a flat surface, and
a second interior flexible blade connected to and integrally formed with the interior body portion and a second interior end portion, at least a portion of the second interior flexible blade comprising a flat surface; and
an exterior flexure member disposed about and coupled to the interior flexure member, the exterior flexure member having
a first exterior flexible blade connected to and integrally formed with a first exterior end portion and an exterior body portion, at least a portion of the first exterior flexible blade comprising a flat surface, and
a second exterior flexible blade connected to and integrally formed with the exterior body portion and a second exterior end portion, at least a portion of the second exterior flexible blade comprising a flat surface,
wherein the first interior end portion and the first exterior end portion are coupled to one another to form a first flexure end portion, the second interior end portion and the second exterior end portion are coupled to one another to form a second flexure end portion, and the interior body portion and the exterior body portion are coupled to one another to form a flexure body portion, such that the first interior flexible blade and the first exterior flexible blade form a first cross-blade flexure operable to facilitate relative rotation between the first flexure end portion and the flexure body portion about a first axis, and the second interior flexible blade and the second exterior flexible blade form a second cross-blade flexure operable to facilitate relative rotation between the second flexure end portion and the flexure body portion about a second axis.

2. The multi-axis flexure device of claim 1, wherein the first and second interior flexible blades define planes that are orthogonal to one another.

3. The multi-axis flexure device of claim 1, wherein the first and second exterior flexible blades define planes that are parallel to one another.

4. The multi-axis flexure device of claim 1, wherein the first interior flexible blade and the first exterior flexible blade define planes that are orthogonal to one another.

5. The multi-axis flexure device of claim 4, wherein the second interior flexible blade and the second exterior flexible blade define planes that are orthogonal to one another.

6. The multi-axis flexure device of claim 1, wherein the first and second axes intersect.

7. The multi-axis flexure device of claim 6, wherein at least one of the first or second interior flexible blades defines a plane that is perpendicular to a plane defined by the first and second axes.

8. The multi-axis flexure device of claim 6, wherein at least one of the first or second interior flexible blades defines a plane that is non-perpendicular to a plane defined by the first and second axes.

9. The multi-axis flexure device of claim 1, wherein
the interior flexure member further comprises
a third interior flexible blade connected to and integrally formed with the first interior end portion and the interior body portion, and
a fourth interior flexible blade connected to and integrally formed with the interior body portion and the second interior end portion; and
the exterior flexure member further comprises
a third exterior flexible blade connected to and integrally formed with a third exterior end portion and the exterior body portion, and
a fourth exterior flexible blade connected to and integrally formed with the exterior body portion and a fourth exterior end portion.

10. The multi-axis flexure device of claim 9, wherein the third interior flexible blade defines a plane that is parallel to the plane defined by the first interior flexible blade, the fourth interior flexible blade defines a plane that is parallel to the plane defined by the second interior flexible blade, the third exterior flexible blade defines a plane that is parallel to the plane defined by the first exterior flexible blade, and the fourth exterior flexible blade defines a plane that is parallel to the plane defined by the second exterior flexible blade.

11. The multi-axis flexure device of claim 1, wherein the exterior flexure member is coupled to the interior flexure member by at least one of a weld, a braze, a solder, or an adhesive.

12. The multi-axis flexure device of claim 1, wherein the first interior end portion, the second interior end portion, the interior body portion, the first interior flexible blade, and the second interior flexible blade form a monolithic structure.

13. The multi-axis flexure device of claim 1, wherein the first exterior end portion, the second exterior end portion, the exterior body portion, the first exterior flexible blade, and the second exterior flexible blade form a monolithic structure.

14. A multi-axis flexure system, comprising:
a multi-axis flexure device including
an interior flexure member having
a first interior flexible blade connected to and integrally formed with a first interior end portion and an interior body portion, at least a portion of the first interior flexible blade comprising a flat surface, and
a second interior flexible blade connected to and integrally formed with the interior body portion and a second interior end portion, at least a portion of the second interior flexible blade comprising a flat surface, and
an exterior flexure member disposed about and coupled to the interior flexure member, the exterior flexure member having
a first exterior flexible blade connected to and integrally formed with a first exterior end portion and an exterior body portion, at least a portion of the first exterior flexible blade comprising a flat surface, and
a second exterior flexible blade connected to and integrally formed with the exterior body portion and a second exterior end portion, at least a portion of the second exterior flexible blade comprising a flat surface, wherein the first interior end portion and the first exterior end portion are coupled to one another to form a first flexure end portion, the second interior end portion and the second exterior end portion are coupled to one another to form a second flexure end portion, and the interior body portion and the exterior body portion are coupled to one another to form a flexure body portion, such that the first interior flexible blade and the first exterior flexible blade form a first cross-blade flexure operable to facilitate relative rotation between the first flexure end portion and the flexure body portion about a first axis, and the second interior flexible blade and the second exterior flexible blade form a second cross-blade flexure operable to facilitate relative rotation between the second flexure end portion and the flexure body portion about a second axis;

a first structure coupled to the first flexure end portion; and a second structure coupled to the second flexure end portion to facilitate relative rotation of the first and second structures about the first and second axes.

15. The system of claim 14, wherein the first structure comprises a mounting structure of a satellite, and the second structure comprises a mirror.

16. A method for making a multi-axis flexure device, comprising:

obtaining an interior flexure member precursor having
a first interior flexible blade connected to and integrally formed with a first interior end portion and an interior body portion, at least a portion of the first interior flexible blade comprising a flat surface, and
a second interior flexible blade connected to and integrally formed with the interior body portion and a second interior end portion, at least a portion of the second interior flexible blade comprising a flat surface,
a first interior sacrificial connecting portion connected to and integrally formed with the first interior end portion and the interior body portion, and
a second interior sacrificial connecting portion connected to and integrally formed with the second interior end portion and the interior body portion;

obtaining an exterior flexure member precursor having
a first exterior flexible blade connected to and integrally formed with a first exterior end portion and an exterior body portion, at least a portion of the first exterior flexible blade comprising a flat surface, and
a second exterior flexible blade connected to and integrally formed with the exterior body portion and a second exterior end portion, at least a portion of the second exterior flexible blade comprising a flat surface,
a first exterior sacrificial connecting portion connected to and integrally formed with the first exterior end portion and the exterior body portion, and
a second exterior sacrificial connecting portion connected to and integrally formed with the second exterior end portion and the exterior body portion;

disposing the exterior flexure member about the interior flexure member;

coupling the exterior flexure member to the interior flexure member,
wherein the first interior end portion and the first exterior end portion are coupled to one another to form a first flexure end portion, the second interior end portion and the second exterior end portion are coupled to one another to form a second flexure end portion, and the interior body portion and the exterior body portion are coupled to one another to form a flexure body portion, such that the first interior flexible blade and the first exterior flexible blade form a first cross-blade flexure, and the second interior flexible blade and the second exterior flexible blade form a second cross-blade flexure;

removing the first interior sacrificial connecting portion and the first exterior sacrificial connecting portion to separate the first interior end portion and the first exterior end portion from the interior body portion and the exterior body portion, wherein the first cross-blade flexure is operable to facilitate relative rotation between the first flexure end portion and the flexure body portion about a first axis; and removing the second interior sacrificial connecting portion and the second exterior sacrificial connecting portion to separate the second interior end portion and the second exterior end portion from the interior body portion and the exterior body portion, wherein the second cross-blade flexure is operable to facilitate relative rotation between the second flexure end portion and the flexure body portion about a second axis.

17. The method of claim 16, wherein obtaining the interior flexure member precursor comprises forming the first and second interior flexible blades in a workpiece.

18. The method of claim 17, wherein forming the first and second interior flexible blades in the workpiece comprises machining the workpiece.

19. The method of claim 18, wherein machining the workpiece comprises at least one of electrical discharge machining (EDM) or milling.

20. The method of claim 16, wherein obtaining the exterior flexure member precursor comprises forming the first and second exterior flexible blades in a workpiece.

21. The method of claim 20, wherein forming the first and second exterior flexible blades in the workpiece comprises machining the workpiece.

22. The method of claim 21, wherein machining the workpiece comprises at least one of electrical discharge machining (EDM) or milling.

23. The method of claim 16, wherein coupling the exterior flexure member to the interior flexure member comprises at least one of welding, brazing, soldering, or bonding.

24. The method of claim 16, wherein removing the first interior sacrificial connecting portion and the first exterior sacrificial connecting portion comprises at least one of electrical discharge machining (EDM), milling, or cutting.

25. The method of claim 16, wherein removing the second interior sacrificial connecting portion and the second exterior sacrificial connecting portion comprises at least one of electrical discharge machining (EDM), milling, or cutting.

26. The multi-axis flexure device of claim 1, wherein
the interior flexure member comprises a first interface surface, a second interface surface, and a third interface surface,
the first interior end portion and the first exterior end portion are coupled to one another at the first interface surface,
the second interior end portion and the second exterior end portion are coupled to one another at the second interface surface, and
the interior body portion and the exterior body portion are coupled to one another at the third interface surface.

27. The multi-axis flexure device of claim 26, wherein the first interface surface, the second interface surface, and the third interface surface are each disposed on an annular flange extending from the interior flexure member.

* * * * *